Dec. 17, 1963　　　H. TRIPPEL　　　3,114,348
AMPHIBIOUS VEHICLE
Filed Jan. 23, 1961　　　　　4 Sheets-Sheet 1
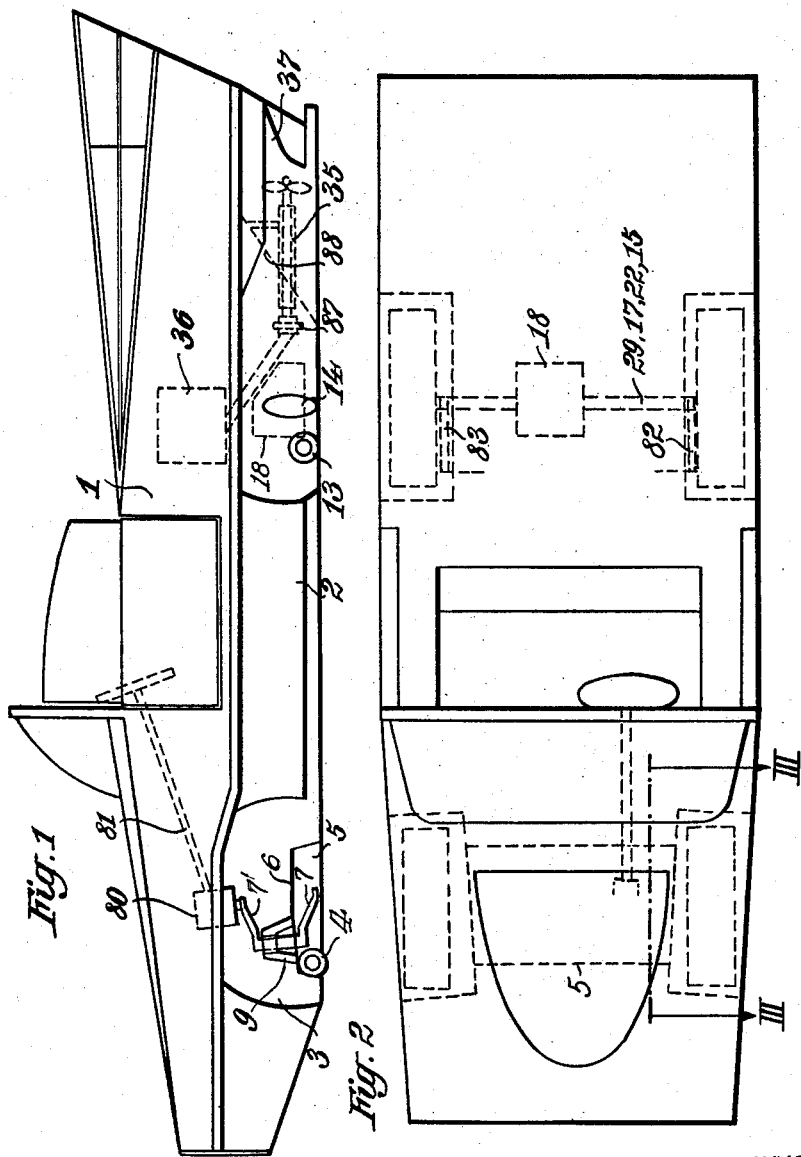
INVENTOR
HANNS TRIPPEL
BY Christie, Parker & Hale
ATTORNEYS.

Dec. 17, 1963 H. TRIPPEL 3,114,348
AMPHIBIOUS VEHICLE
Filed Jan. 23, 1961 4 Sheets-Sheet 2

INVENTOR.
HANNS TRIPPEL
BY Christie, Parker & Hale
ATTORNEYS.

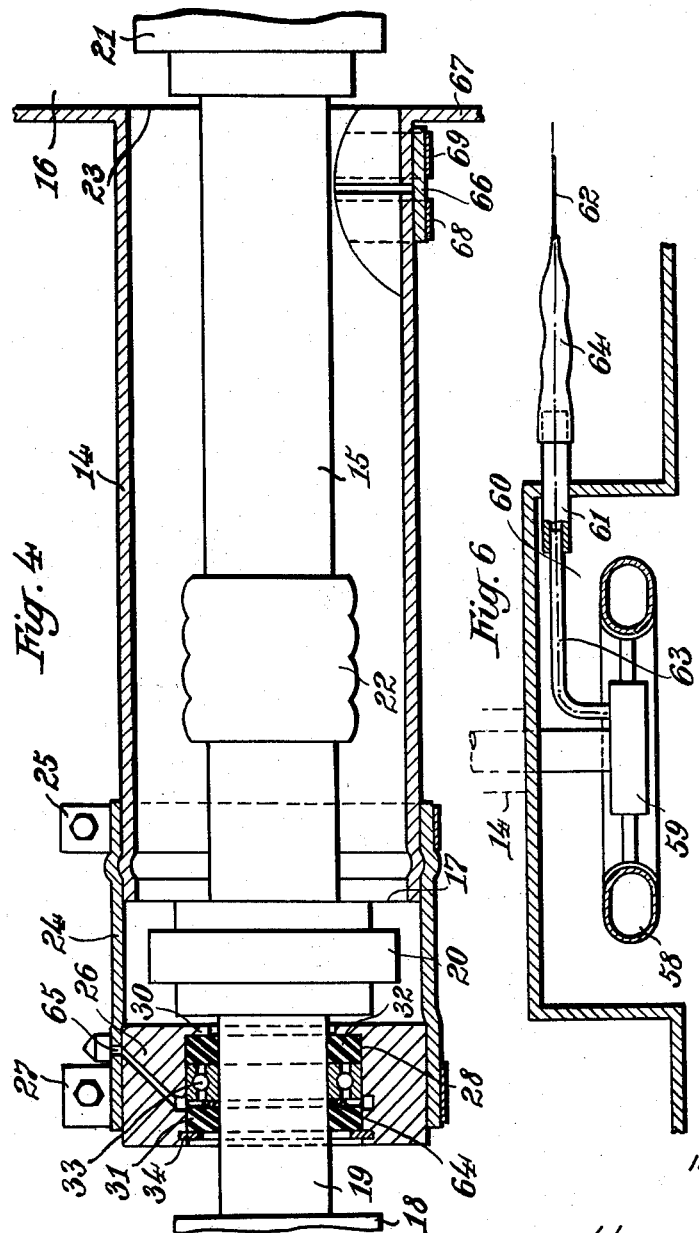

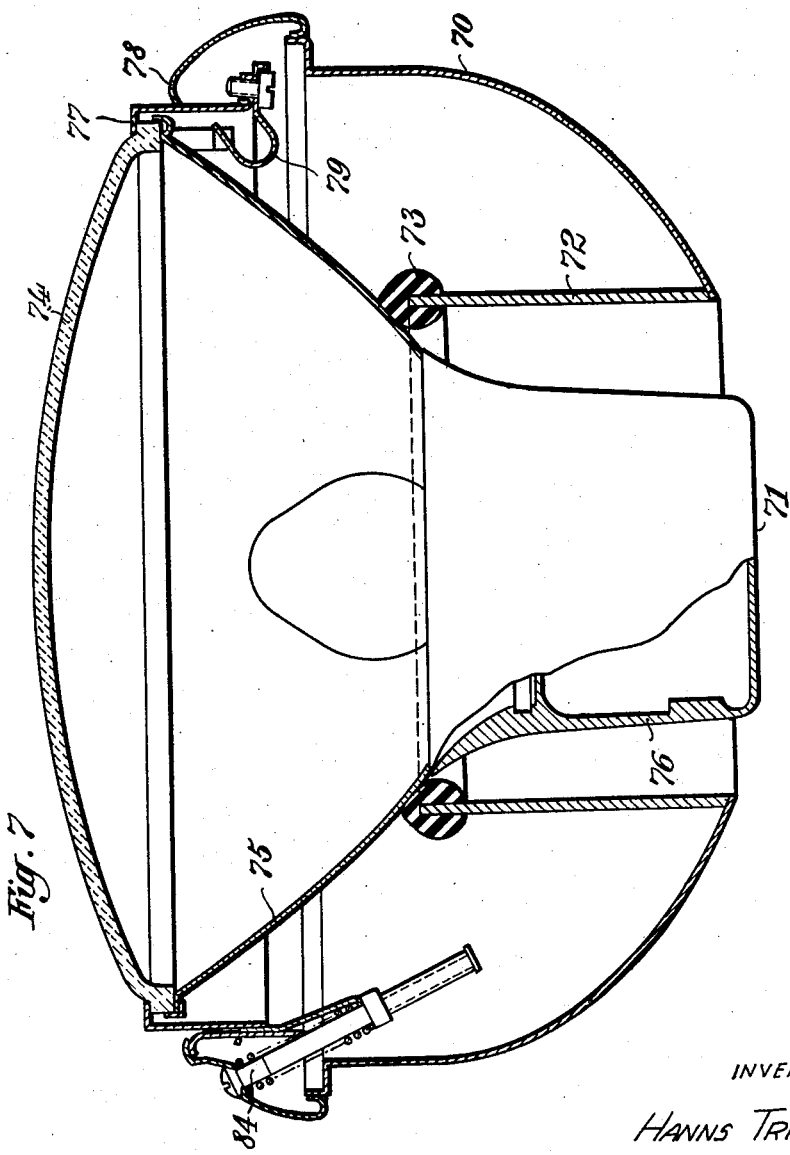

United States Patent Office 3,114,348
Patented Dec. 17, 1963

3,114,348
AMPHIBIOUS VEHICLE
Hanns Trippel, Sprendlingen, Kreis Offenbach, Germany, assignor, by mesne assignments, to Amphicar Corporation of America, New York, N.Y., a corporation of New York
Filed Jan. 23, 1961, Ser. No. 84,253
Claims priority, application Germany Jan. 21, 1960
14 Claims. (Cl. 115—1)

The present invention concerns an amphibious vehicle having wheels and at least one screw propeller provided on the outside of a buoyant body mounting the engine internally of the rear portion of the body.

A consideration in this type of vehicle is the effective sealing around those parts of the propulsion systems which project outwardly of the body. Maintaining buoyant integrity of the body around the drive shafts, the steering units, the screw shafts, and the braking system is one of the features of this invention.

In providing watertight seals around the exterior appurtenances of an amphibious vehicle, allowances must be made for outside influences which cannot be controlled. Such outside influences include displacements of the wheels of the vehicle when it is operating on land and encounters a bump or other obstacle. To accommodate said displacements and maintain watertight integrity of the vehicle body or hull, a known expedient is the provision of rubber bellows mounted between the body and axles and extending over a substantial length of the wheel axles. This type of sealing is expensive, and is subject to rapid failure from inherent defects in such seals. It is also known, for example, to arrange the vehicle steering mechanism outside the buoyant body or hull, and to pass only one actuating member, for example the steering column, through the hull. This construction has the disadvantage that the pivoted linkage system of the steering mechanism is then exterior to the hull, and is relatively unprotected from impact with submerged objects and from corrosion when the vehicle operates in salt water.

An object of this invention is to avoid such disadvantages of known vehicles by providing seals disposed in recesses of the vehicle hull. Passageways are provided adjacent the seals for the movable propulsion system parts. The passageways lead to the exterior of the floating body and are open to the water when the vehicle is water borne. Such passageways protect the enclosed apparatus.

Another object of the invention is to enclose the steering and suspension system displaceable members for the front and rear wheels inside channels extending transversely of the longitudinal axis of the vehicles, which channels are closed circumferentially and are open at their ends to the exterior of the vehicle.

Another object of this invention is to enclose the rear axles in inwardly directed channels extending transversely of the buoyant hull from the sides thereof to the drive system differential. These channel members are resiliently mounted to the differential and are configured to accommodate vertical displacement of the rear axles.

According to a further object of the invention, the channel or enclosure members for the rear wheel half-shafts or axles are also resiliently fastened at their outer ends to a flanged portion of the adjacent wheel recesses by means of a rubber sleeve so as to mutually insulate the hull and the propulsion system from vibration.

A further object of the invention is to construct the channel or enclosure members of synthetic material to obtain good corrosion resistance and weight properties.

A further object of the invention resides in the provision of two bearings for the propeller shafts in a tubular shaft passageway, which passageway extends in sealing relation from the buoyant body. These bearings may be made of synthetic material, for example polyamide, and are water cooled by water fed to the sleeves through perforations in the propeller shaft passage.

In order that the invention may be more readily understood a preferred embodiment thereof is described below in conjunction with the accompanying drawings in which FIG. 1 shows a diagrammatic side view of the body work of an amphibious vehicle according to the present invention;

FIG. 2 shows a plan view of FIG. 1;

FIG. 4 shows in horizontal section the sealing of a rear wheel axle or half shaft;

FIG. 6 shows diagrammatically the passage of a brake cable through the vehicle wheel recess; and FIG. 7 shows the vertical section through a head lamp.

Figure 3:
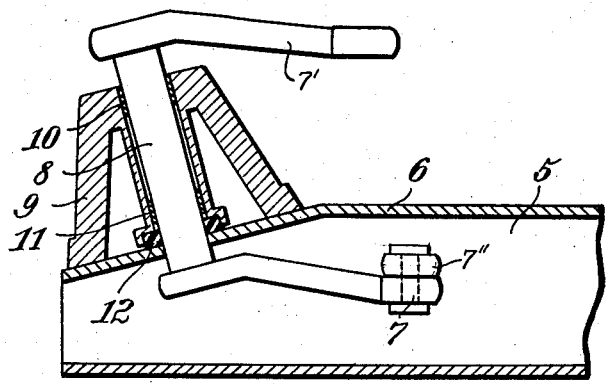
FIG. 3 shows a section along the lines III—III in FIG. 2 showing the front wheel steering mechanism.

The vehicle body shown in FIGURES 1 and 2 comprises an upper body shell 1 and a lower buoyant body portion or well 2. For reasons of clarity, the wheels and wheel suspensions are not shown in FIGURES 1 and 2. A front wheel recess 3 is formed in opposite front corners of the lower body 2. Bearing or torsion rods 4 for the front wheel suspension are provided in the forward portions of transverse inverted U-shaped channel 5 disposed centrally of the wheel recess 3. Channel or enclosure 5 is positioned in the lower body portion 2 with its substantially vertical legs transverse of the body 2 and sealed in watertight relation, as by welding, to the upper side of the undersurface of the lower body 2. The opposite ends of channel 5 open exteriorly of the vehicle into the wheel recesses 3. The pivotable track rods or connecting links 7″ of the steering mechanism extend transversely of the vehicle through the channel 5. These track rods 7″ are consequently exposed to water, but they are protected as much as possible from sand, mud and other corrosive and erosive materials since they are inside the channel.

As shown in FIGURE 3, only the drag arm or lower lever 7 of a steering mechanism crank or pivot is situated in channel 5. An upper crank arm 7′ is connected to a steering box 80 operated by steering column 81. Second or upper arm 7′ is connected to a drag lever axle or steering crank shaft 8 extending through the upper wall 6 of the front channel 5 to the lower arm 7. All the other parts of the steering linkage are positioned outside the wall 6 inside the watertightly sealed floating body 2. In particular, the relatively sensitive steering drive box 80 and steering column 81 are inside the floating body where they are maintained in a dry condition.

The drag lever axle 8 is journaled in a bearing box 9 mounted on the upper wall 6 of the channel 5 interiorly of the hull 2. The axle 8 is mounted rotatably in two spaced-apart bearing sleeves 10 and 11. A third bearing and seal 12, for example in the form of grooved washers or a labyrinth packing, is situated at the lower end of the bearing housing 9 adjacent the upper surface 6 of channel enclosure 5 where the shaft 8 passes into the channel.

A seal passage on the crank axle 8 is thus provided so that a very accurately guided and rigidly mounted steering system part passes through the lower guide and outwardly of enclosure wall 6 of the lower body 2 so that the bearings and seals are well protected and relatively unloaded, and, therefore, function extremely reliably. The construction described above provides that the more sensitive parts of the steering mechanism lie inside the floating body 2, while other parts, namely the drag lever 7 and the track or connecting rods, lie outside the floating body exposed to water but are protected by a cover plate across the lower portion of the channel 5. The cover plate is continuous with the bottom of the hull and may be integral with the hull.

FIGURE 1 shows the orientation of bearing block 9 and steering drive 80, as well as that of the steering column 81.

Bearing rods 13 are provided for the rear wheel suspension. Torson bar springs 82 and 83 inserted into these bearing rods 13 to extend transversely interiorly of the lower body or hull 2 and longitudinally exteriorly of the vehicle to a connection with each rear wheel axle 15 as shown in FIGURE 2. Channel members 14 are provided rearwardly of the bearing rods 13 for the rear wheel half-shafts or axles. The channel members 14 open at their outer ends to rear wheel recesses 16 and pass into the inside of the floating lower body member 2. The channel members 14 have an elliptical transverse cross section with a substantially vertical major axis. This cross section accommodates a displaceable half-shaft or rear axle 15 which passes longitudinally of the channel 14 to differential drive shafts 19.

As shown in FIGURE 4, channel member 14 begins at the wheel recesses 16 and terminates at 17 adjacent a bead or rib, the purpose of which will be explained later. A differential housing 18, with its transverse drive shafts 19 (only one of which is shown), lies adjacent the inner end 17 of channel 14. The half-shaft 15 is connected to differential shaft 19 by means of a cross head or universal coupling 20. The other end of half-shaft 15 is connected by means of a cross head or universal joint 21 with a rear wheel (not shown). The mutually adjustable parts of a telescoping spline joint are sealed inside the channel member 14 by a bellows 22. The channel member 14 opens outwardly at 23 into wheel recesses 16.

A rubber sleeve 24 is fastened to the tube 14 by a clamping ring 25 adjacent the bead. The bead assures a tight tensioned engagement with the sleeve 24 to maintain a watertight seal. The other end of the sleeve 24 is fastened to the outer circumference of an axially bored closure plug and bearing ring 26 by means of a clamping ring 27 peripherally thereof. The closure plug 26 may also have a bead raised outwardly so that the rubber sleeve will be firmly held, but in FIGURE 4 it is shown that plug 26 has a diameter sufficient to assure secure engagement with sleeve 24.

The inboard end of bore 28 of the closure ring 26 is substantially greater than the diameter of the differential shaft 19 projecting coaxially into the bore. An assembly of preferably two spaced apart seals 31 and 32, preferably in the form of labyrinth packing rings, is arranged around the shaft section 19 within the bore 28. The bearing ring 26 has an annular projecting flange 30 adjacent the coupling 20 defining a reduced diameter bore portion which limits the amount of water in contact with the bearing 32. At least one roller or ball bearing 33, serving to guide the bearing ring 26 on the shaft 19, and therefore providing definite seating surfaces for the seals 31 and 32, is positioned between labyrinth seals 31 and 32. The seals 31 and 32 and bearing 33 are held in the bearing ring 26 on the one end by flange 30, and on the other end by a spring retaining ring 34. A spacer ring 64 may be inserted between the seal 31 and the bearing 33. A duct 65 is formed radially of the bearing ring 26 and extends to the space adjacent spacer ring 64 to facilitate lubrication of the bearing 33.

With this construction, the labyrinth seals 31 and 32 are loaded equally and substantially concentrically so that their loading is kept to a minimum, and their working life is extended. Moreover, the construction described has the essential advantage that the seals are easily accessible for replacement, yet a simple and trouble-free structure is maintained.

The arrangement of the rubber sleeve 24 assures that a watertight seal of the buoyant or lower body 2 is maintained relative to the differential shafts 19. This watertightness is maintained even when the axles 15 are displaced, as when the wheels are engaged on ground when the vehicle traverses shallow water having a depth insufficient to float the vehicle.

In a particular preferred embodiment of the invention shown in the lower right hand side of FIGURE 4, the outer end of the channel member 14 is connected to an inwardly flanged edge 67 of the wheel recess 16 by a rubber sleeve 66. This connection can, as with the rubber sleeve 24, be provided by clamping rings 68 and 69. If desired, beads for fixing the rubber sleeves 66 from axle displacement may be utilized.

The embodiments of the invention described above contemplate the use of synthetic material tubing for the channel members 14. The use of synthetic material assures that corrosion will not ruin the watertight integrity of the vehicle. Also, the weight of the vehicle is reduced.

As shown in FIGURES 1 and 2, two firmly mounted propellers are utilized. A tubular shaft passage 35 (see FIGURE 5) passes through the floating vehicle body. The passage 35 is welded to the vehicle hull to assure watertightness. A propeller shaft 38 is axially rotatably disposed in this passage. The propeller shaft 38 extends through an upwardly and rearwardly sloping rear body wall 88 forming a transom. The forward end of shaft 38 is connected to a universal joint 87, from which joint 87 a second shaft extends to a drive means 36. In the case of a preferred embodiment of this invention the drive means 36 is a reduction gear unit mounted forwardly of the differential 18. Differential 18 is itself mounted somewhat above the axes of rotation of the rear wheels, and for this reason the universal joints 20 and 21 are provided in conjunction with each rear axle 15.

A downwardly concave propeller race tunnel 37 is formed in the end side of hull 2 forwardly of the propeller 39. The shaft passage 35 extends substantially horizontally and concentric to the axis of the propeller tunnel or channel 37. It is apparent, however, that two propeller tunnels may be provided if such are desired.

Figure 5:
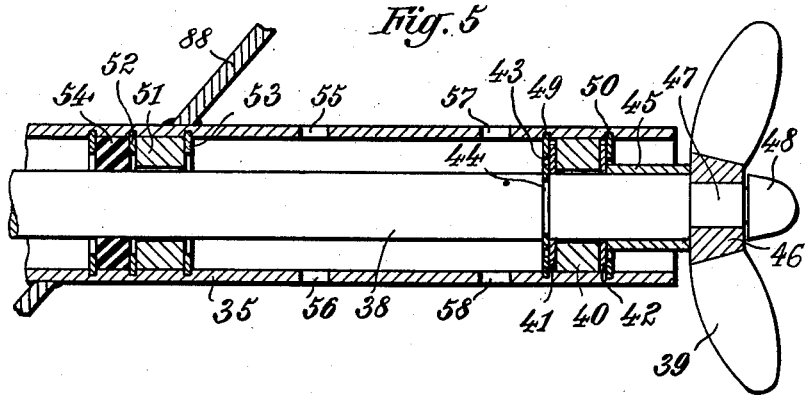
FIG. 5 shows in vertical section the arrangement of a propellor shaft passageway.

A preferred means of sealing a propeller shaft 38 is shown in FIGURE 5. The shaft passage 35 contains the shaft 38 of the propeller 39. The shaft 38 is mounted at spaced apart locations by means of journal bearing sleeves 40 and 51 of synthetic material, such as polyamide. For example, the rear bearing has a journal sleeve 40 which is held between two spacer washers 41 and 42. The spacer washers 41 and 42 are held relative to the shaft 38 on the one end by a spring retainer ring 43 engaged in a peripheral groove 44 of the shaft 38, and on the other end, preferably by a spacing sleeve or collar 45. The collar 45 extends from the washer 42 to abutment with the hub 46 of propeller 39. Additionally, the spacer washers 41 and 42 are positioned by spring retainer rings 49 and 50 which are held in circumferential grooves on the inner wall of the shaft passageway 35. It is noted that the spacer washers 41 and 42 can be made of synthetic material. Journal bearing 40 also serves as a thrust bearing in combination with parts 41, 42, 43, 45, 49 and 50.

The propeller 39 is preferably made of synthetic material such as polyamide, and is maintained on a cylindrical shaft extension 47 by means of nut 48. In this way, the new and relatively simple bearing construction is produced. Even damage to a propeller blade does not lead to destruction of the bearing.

A second journal bearing sleeve 51 corresponding to sleeve 40, and preferably made of polyamide, is arranged at a distance forwardly of the sleeve 40 and is held relative to the inner wall of the tube 45 by means of spring retainer rings 52 and 53 engaged in annular grooves of tube 35.

In FIGURE 5, to the left of journal bearing sleeve 51, is shown a labyrinth seal 54 in the form of one of several annularly grooved washers, held in place by spring retainer rings engaged with the interior of tube 35.

The right hand end of the passageway 35 is open so that the bearing 40 is cooled by water. In the region between the sleeves 50 and 51, the passageway is perforated, as at 55, 56, 57 and 58, so that the bearing assembly is indirectly cooled at sleeve 51.

Also, with this construction, the seal and bearing assembly is constructed in the shape of a well-protected tubular element. Consequently an improved cooling of the bearing and a simplified construction of the bearing are provided simultaneously.

FIGURE 6 illustrates a wheel 58 with a braking drum 59, the wheel being situated in a wheel recess 60. The braking drum 59 is constructed for the manual parking brake operable independently of a standard hydraulic brake system also included in the drum 59. The brake drum 59 is disposed outside the floating body; therefore, a conduit tube or bushing 61 for the actuating cable 62 of a Bowden wire is arranged in the wall of the wheel recess 60. The cable 62 passes from the tube 61 to the brake drum 59 through a waterproof flexible tubing 63 connected between the bushing and the brake drum 59. The cable 62 of the Bowden wire is sealed by a rubber bellows 64 inside the hull 2, which bellows is connected between the tubing 61 and the cable 62. In this way, it is assured that the inside of the floating body is sealed from the water. Control of the brake is, therefore, easily possible.

FIGURE 7 shows a vertical section through a headlamp. A substantially hemispherical, shell-shaped frame construction 70 provided by this invention is novel in that its rear middle extremity 71 is open to the interior of the hull, and is provided at the edges of the opening with a forwardly extending cylindrical housing part 72 welded to the shell 70. At the forward edge of this housing part there is a deformable circular seal or gasket element 73 fabricated of rubber, or other resilient material, projecting into the lamp shell 70.

The headlamp proper, with its glass cover 74 and reflector 75 connected to a base 76, is fastened to the vehicle by inserting the lamp base 76 into the cylindrical housing part 72. In this position, a clamping ring 77, mounted to the forward rim of the shell 70 by a second or front shell 78 hinged at 79, cooperates with the lens 74 of the lamp to hold the lamp in place. A secure seat of the lamp in the shell 70 is effected by means of spring-loaded, adjustable screws 84 mounted in front shell 78.

With this construction, sealing of the inside of the shell 70 is assured so that the parts adjacent the lamp support base 76 are maintained dry. As the vehicle moves forward in its waterborne condition, the pressure of water against the lens urges the lamp reflector 75 against the gasket 73 so that the seal is increasingly effective.

I claim:

1. An amphibious vehicle having a watertight buoyant body comprising
   a pair of transversely spaced-apart wheels disposed exteriorly of the rear portion of the vehicle,
   a differential disposed interiorly of the body between the rear wheels,
      the differential having a pair of oppositely extending drive shafts oriented transversely of the vehicle,
   an axle for each wheel extending inwardly of the body adjacent a corresponding differential shaft,
   an enclosure for each axle,
      each enclosure having its interior opening exteriorly of the vehicle and being connected to the vehicle body in a watertight seal adjacent the respective wheel,
   coupling means between each axle and the adjacent differential shaft,
      said coupling means being disposed within the enclosure,
   and a watertight sealing and bearing means between the inner end of each enclosure and the adjacent differential shaft.

2. An amphibious vehicle according to claim 1 including resilient axle mounting means connected between the vehicle body and the exterior end of each axle
   for guiding the exterior end of the axle in vertical oscillations, and
   for absorbing the energy of said oscillations.

3. An amphibious vehicle according to claim 2 wherein the enclosure for each axle has an elliptical cross section, the major axis of the ellipse being oriented substantially vertically.

4. An amphibious vehicle according to claim 1 wherein the coupling between the axle and the differential shaft is a universal joint, and including
   a telescoping spline joint in the axle, and
   a second universal joint between the spline joint and the exterior end of the axle.

5. An amphibious vehicle according to claim 1 wherein the sealing and bearing means comprises a sealing and bearing ring having a central bore,
   the differential shaft projecting through the bore,
   a roller bearing mounted between the differential shaft and the ring and disposed within the bore, and
   a packing ring disposed on each side of the roller bearing within the bore in watertight rotatable seal relation with the differential shaft to seal the interior of the enclosure from the differential.

6. An amphibious vehicle according to claim 5 wherein the inner end of the enclosure is spaced apart from the bearing and sealing ring,
   a raised bead peripherally of the exterior of the inner end of the enclosure, and
   a flexible and resilient sleeve engaged
      at one end with the bearing and sealing ring in a watertight sealing relation and engaged
      at the other end over the bead in a watertight sealing relation.

7. An amphibious vehicle according to claim 5 including
   an inwardly extending annular flange at the end of the bore adjacent said coupling means,
      the flange being closely spaced from the differential shaft,
   the packing ring disposed outboard of the roller bearing being positioned axially of the bore in one direction by said annular flange,
   the outboard packing ring being positioned axially of the bore in the other direction by the roller bearing,
   the inboard packing ring being positioned axially of the bore by a spring retainer ring engaged in an annular recess in the bore adjacent the differential housing.

8. An amphibious vehicle according to claim 7 including
   a spacer washer disposed concentrically of the differential shaft and positioned between the inboard packing ring and the roller bearing,
      the washer having an external diameter substantially less than the inner diameter of the bore adjacent the washer and
   a substantially radial lubrication duct through the bearing and sealing ring communicating with the bore adjacent the spacer washer.

9. An amphibious vehicle according to claim 1 including a flexible and resilient seal between the enclosure and the vehicle body.

10. An amphibious vehicle comprising
    a watertight buoyant body,
    a propeller disposed exteriorly of the rear of the vehicle,
    a rotatable shaft extending through the vehicle body and mounting the propeller,
    a tube disposed around the shaft and extending both interiorly and exteriorly of the body, the tube being rigidly and watertightly mounted to the body, and spaced-apart bearing means rotatably mounting the shaft in the tube, each bearing means comprising a synthetic material sleeve journalling the shaft and fixed to the tube, the sleeve adjacent the propeller comprising a pair of annular discs abutting opposite ends of the sleeve, each disc being maintained against the sleeve by a resilient retaining ring engaged in an an annular recess of the tube, the disc opposite from the propeller further being maintained against the sleeve by a resilient retaining ring engaged in a circumferential recess in the shaft, and a second sleeve concentric with the shaft abutted between the propeller and the disc adjacent to the propeller, whereby the bearing adjacent to the propeller acts as a thrust bearing, and the sleeve adjacent to the interior end of the passage includes a packing ring and resilient retaining rings engaged in annular recesses of the tube to position the bearing sleeve and the packing ring axially of the sleeve.

11. An amphibious vehicle according to claim 10 wherein the tube exteriorly of the body is perforated between the spaced-apart sleeves for cooling and lubrication of said bearings by water when the vehicle is water-borne.

12. An amphibious vehicle according to claim 10 in which said propeller is made of polyamide.

13. An amphibious vehicle according to claim 1 including a second pair of transversely spaced apart wheels disposed exteriorly of the forward portion of the vehicle, means for steering the second pair of wheels comprising a steering column, a steering box connected to the steering column and operable thereby, a rotatable axle extending from the steering box and rotatable in response to operation of the steering box, and pivotable link means connected to the axle and pivotable by rotation of the axle, the link means being connected between the pair of spaced apart wheels, and a channel secured to the inner surface of the bottom of the body between the steerable wheels, the channel being disposed transversely of the body and being open at opposite ends to the exterior of the body, the rotatable axle extending from the steering box through the upper portion of the channel in water-tight sealing relation, the pivotable link means being disposed within the channel.

14. An amphibious vehicle according to claim 13 in which the link means for the steerable wheels comprise track rods and a drag arm, the drag arm being secured to the rotatable axle and being pivoted to the track rods.

References Cited in the file of this patent

UNITED STATES PATENTS

| | | |
|---|---|---|
| 1,180,013 | Cook et al. | Apr. 18, 1916 |
| 2,338,796 | Berquist | Jan. 11, 1944 |
| 2,405,799 | Smeallie | Aug. 13, 1946 |
| 2,826,682 | Falge | Mar. 11, 1958 |
| 2,868,961 | Worden | Jan. 13, 1959 |
| 2,981,221 | Gillois et al. | Apr. 25, 1961 |